(12) United States Patent
Wilson

(10) Patent No.: US 7,407,033 B2
(45) Date of Patent: Aug. 5, 2008

(54) VEHICLE DISPLAY

(76) Inventor: Michael T. Wilson, M.C.F.-STW, 970 Pickett St. North, Bayport, MN (US) 55003-1490

( * ) Notice: Subject to any disclaimer, the term of this patent is extended or adjusted under 35 U.S.C. 154(b) by 218 days.

(21) Appl. No.: 11/255,769

(22) Filed: Oct. 21, 2005

(65) Prior Publication Data
US 2006/0208922 A1 Sep. 21, 2006

Related U.S. Application Data

(60) Provisional application No. 60/620,437, filed on Oct. 21, 2004.

(51) Int. Cl.
*B60K 17/04* (2006.01)
(52) U.S. Cl. .................. 180/371; 280/727; 280/762; 180/372; 345/7; 362/500; 340/815.45; 301/37.25; 301/95.101; 301/95.102
(58) Field of Classification Search ................. 280/727, 280/762; 180/343, 356, 371, 372; 345/7; 362/500; 301/37.25, 95.101, 95.102; 340/815.45
See application file for complete search history.

(56) References Cited

U.S. PATENT DOCUMENTS

| 1,783,780 | A | * | 12/1930 | Evans .......................... 180/369 |
| 3,420,327 | A | * | 1/1969 | Nallinger et al. ............. 180/255 |
| 4,214,683 | A | * | 7/1980 | Wills et al. .................. 224/42.2 |
| 5,490,342 | A | * | 2/1996 | Rutterman et al. ............ 40/587 |
| 2004/0130905 | A1 | * | 7/2004 | Olds et al. ................... 362/487 |
| 2006/0175892 | A1 | * | 8/2006 | Korpi et al. ............... 301/37.25 |
| 2007/0069573 | A1 | * | 3/2007 | Gabriel ..................... 301/37.25 |

* cited by examiner

*Primary Examiner*—Christopher Ellis
*Assistant Examiner*—Jacob Meyer
(74) *Attorney, Agent, or Firm*—Nawrocki, Rooney & Sivertson, P.A.

(57) ABSTRACT

A monitor display carried by a vehicle. The monitor display is mounted proximate a rim of a corresponding motive wheel of a vehicle. A rim of the motive wheel has a surface which is contoured to substantially conform to an inner surface of the monitor display. The monitor display is rigidly maintained in a non-rotating fashion.

8 Claims, 9 Drawing Sheets

VEHICLE DISPLAY

CROSS-REFERENCE TO RELATED APPLICATIONS

This is a regular application filed under 35 U.S.C. § 111 (a) claiming priority, under 35 U.S.C. § 119(e) (1), of provisional application Ser. No. 60/620,437, previously filed on Oct. 21, 2004 under 35 U.S.C. § 111(b).

TECHNICAL FIELD

The present invention deals broadly with the field of vehicles. More narrowly, however, it deals with the display of a visual presentation in a non-rotational manner at a rim of a motive wheel of the vehicle. In a preferred embodiment, the vehicle includes a suspension frame and a conduit extending from the suspension frame to the rim of a motive wheel. The conduit directs display transmission cable to the area of the rim so as to enable the display of a non-rotational presentation of any moving or non-moving portrayal, including movies, television programs and commercial advertising.

BACKGROUND OF THE INVENTION

Motor vehicles can be categorized in numerous ways. One is by the "work:leisure" intended function of the vehicle. In the case of a work function, the rims of one are more motive wheels are typically built for strength and have little, if any, aesthetic attributes.

On the other hand, however, wheels of a leisure vehicle are typically adorned with some sort of appealing structure to make them more attractive. In the case of some vehicles, decorative hubcaps or wheel covers are put into place proximate corresponding rims of the motive wheels. In the prior art, such hubcaps or wheel covers are typically able to rotate relatively freely. In fact, the rotation is intended to impart a pleasing effect.

In the case of some vehicles, however, the decorative structure tends to achieve its goal only if the rim or proximate structure rotates such that a display tends to be maintained generally in a desired orientation. Illustrative of such a structure is the WHEEL ASSEMBLY depicted in U.S. Pat. No. 6,926,369 issued on Aug. 9, 2005 to Tommie L. McCaster, III and Jason T. Clifford. That document teaches a wheel assembly structure for a vehicle which includes a rim for mounting a tire, and a hub which includes a central portion and a connecting portion radiating from the central portion to the rim of that device. A plurality of lug holes are provided in a central portion of the hub. Lug studs pass through the lug holes, and a rear side of the central portion is mounted against an axle hub of the vehicle. The inventors envisioned the mounting of a functioning clock to a front side of the connecting portion of the hub. The clock, in turn conceals the lug holes from view.

The assembly of the McCaster, III et al. document, however, does not maintain the functioning clock in a consistent, rigid orientation wherein the clock is always oriented with the "12" precisely at the top. The way the orientation of the face portion of the clock is substantially maintained in an intended orientation is by providing a bottom weight face portion.

A plurality of roller bearings at the perimeter of the face portion are also provided. This allows the face of the clock to rotate freely, but the bottom weighting tends to enable the face of the clock to be maintained in a desired orientation. Nevertheless, the face will typically swing like a pendulum, and it might well be that such swinging is not only undesired, but also detrimental to the device structure.

The present invention is a structure which addresses the problems and limitations of the prior art. It serves to offer a structure which will maintain a visual presentation in a desired orientation.

SUMMARY OF THE INVENTION

The present invention deals with visual displays presented from vehicles. More particularly, however, the invention deals with the presentation of any moving or non-moving display, including movies, television programs and commercial advertising. The visual presentation is made at one or more rims of motive wheels of the vehicle. The visual presentation, it is intended, includes a monitor for projecting the presentation.

A vehicle for use for travel over land typically employs four motive wheels. Each wheel assembly includes a rim, generally circular relative to an axis. The assembly mounts a substantially annular tire, the tire defining a generally circular opening coaxial with the rim. Means are provided for generating a visual presentation in the opening so defined. The presentation, it is desired, is maintained in a generally defined orientation, and means are provided to retain the presentation in that orientation.

Apparatus can be provided to positively lock the visual presentation against rotation. This can be accomplished by structuring an apparatus in combination with a motive wheel which is generally coaxial along an axis of a drive shaft of the vehicle and wherein the motive wheel is mounted to a suspension frame. The apparatus can include a conduit, extending from the suspension frame to the rim. The conduit directs display transmission cabling to the rim. The apparatus further includes a stub drive shaft which is rotationally driven by the drive shaft of the vehicle. The stub drive shaft does, however, diverge at an acute angle from the vehicle drive shaft. Means, spaced radially from the axis of the vehicle's drive shaft, for transmitting rotation of the stub drive shaft to the motive wheel are included.

In such an embodiment, rotation of the stub drive shaft is transmitted to the motive wheel by means of a pinion gear, mounted at a distal end of the stub drive shaft, in engagement with a ring gear carried by the motive wheel.

The present invention is thus apparatus for enabling the making of a visual presentation at a rim of a motive wheel of a vehicle and for maintaining the visual presentation against rotation as the wheel turns while the vehicle moves over land. More specific features and advantages obtained in view of those features will become apparent with reference to the DETAILED DESCRIPTION OF THE INVENTION, appended claims and accompanying drawing figures.

DESCRIPTION OF THE DRAWING FIGURES

DETAILED DESCRIPTION OF THE INVENTION

Figure 1:
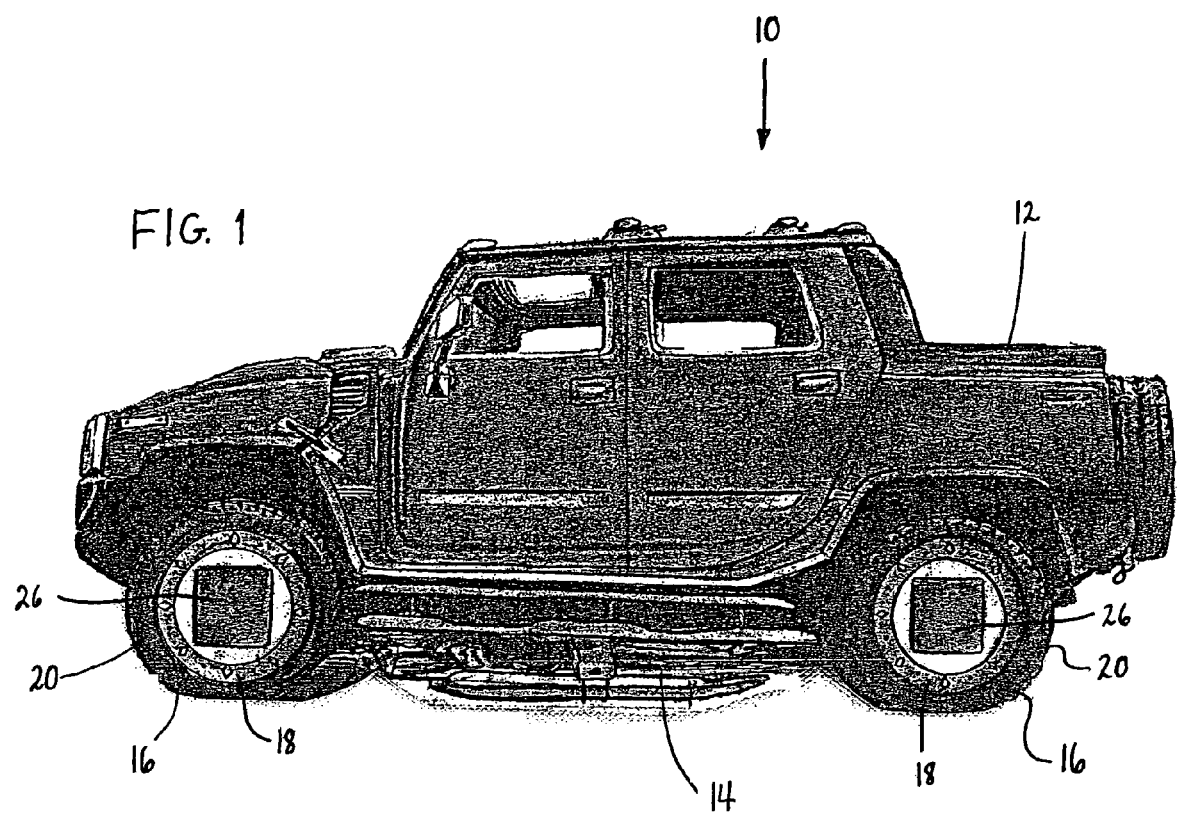
FIG. 1 is a left-side elevational view of a vehicle employing the display in accordance with the present invention.

Referring now to the drawings wherein like reference numerals denote like elements throughout the several views, FIG. 1 illustrates a vehicle 10 which incorporates a display in accordance with the present invention. The vehicle 10 illustrated is a HUMMER®, but it will be understood that the inventive concept could be integrated into virtually any type of land vehicle.

The vehicle 10 is shown as comprising a body 12, an undercarriage 14 and, in the case of the particular vehicle illustrated, four wheels 16. While various vehicles typically employ two-wheel drive (that is, either front or rear drive), other vehicles employ an option of shifting to four-wheel drive in a selective manner, or wherein four-wheel drive is utilized continuously. In the case of the present invention, it is only necessary that a single wheel be a drive, or motive, wheel. If the vehicle employs multiple motive wheels, the invention would be incorporated with regard to each.

FIG. 1 illustrates each wheel 16 as having a rim 18 to which a tire 20 is mounted. Each wheel 16 is also illustrated as having a rim 18 with a cavity 22, generally circular in shape, formed therewithin facing outwardly. As will be seen in more detail with reference to FIG. 3, an assembly is provided which includes a monitor casing 24. Such a monitor casing has a contour which conforms to a contour of a monitor body. This relationship will be discussed in more detail hereinafter.

As also seen in FIG. 1, monitors 26 are received within corresponding monitor casings 24. The present invention serves to maintain such monitors 26 in an orientation wherein a display transmitted on the monitor 26 can easily be perceived visually. This includes orienting the monitors 26 such that they can be easily perceived by an observer without having to angle his head sideways either to the left or the right. A lower edge of the monitor 26 is, it is intended, maintained at least generally parallel to a surface which the vehicle traverses. In one embodiment, the invention incorporates structure which maintains the monitor 26 rigidly oriented with the lower edge thereof substantially parallel to the ground surface.

Figure 2:
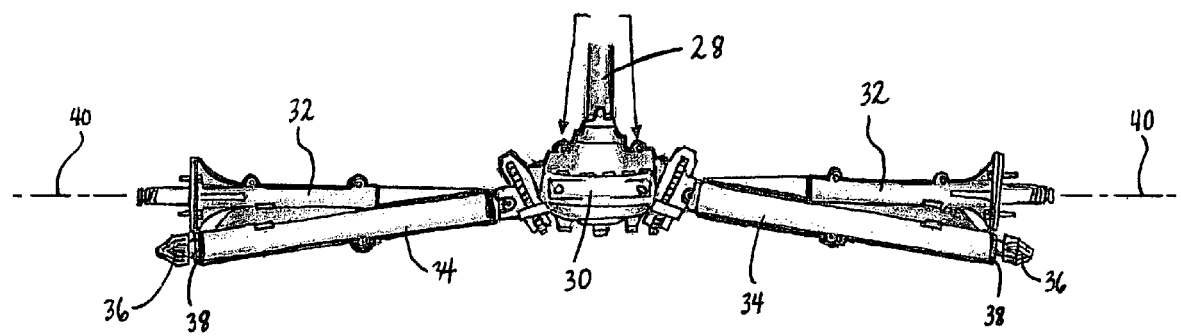
FIG. 2 is a plan view illustrating various transmission components in accordance with the present invention.

FIG. 2 illustrates a main transmission drive 28 which enters a gear box 30. The gear box 30 includes gearing arrangements which enable angular divergence of the main transmission drive 28 to one or more vehicle drive shafts 32 which are angularly spaced at 90° relative to the main transmission drive 28. Typically, such drive shafts 32 serve to impart motive rotation to their corresponding wheels 16.

FIG. 2 also illustrates a stub drive shaft 34, geared to a corresponding drive shaft 32 of the vehicle, which is rotationally driven by the corresponding vehicle drive shaft 32. A stub drive shaft 34 is shown diverging from its corresponding vehicle drive shaft 32 at an acute angle. A pinion gear 36 is mounted at a distal end 38 of each stub drive shaft 34.

As will be able to be seen, the angle of the stub drive shaft 34 relative to its corresponding vehicle drive shaft 32 is a function of the length of the stub drive shaft 34 and the radial distance from an axis 40 along which the vehicle drive shaft 32 extends and the gearing of a ring gear 42 carried by the rim 18.

Figure 3:
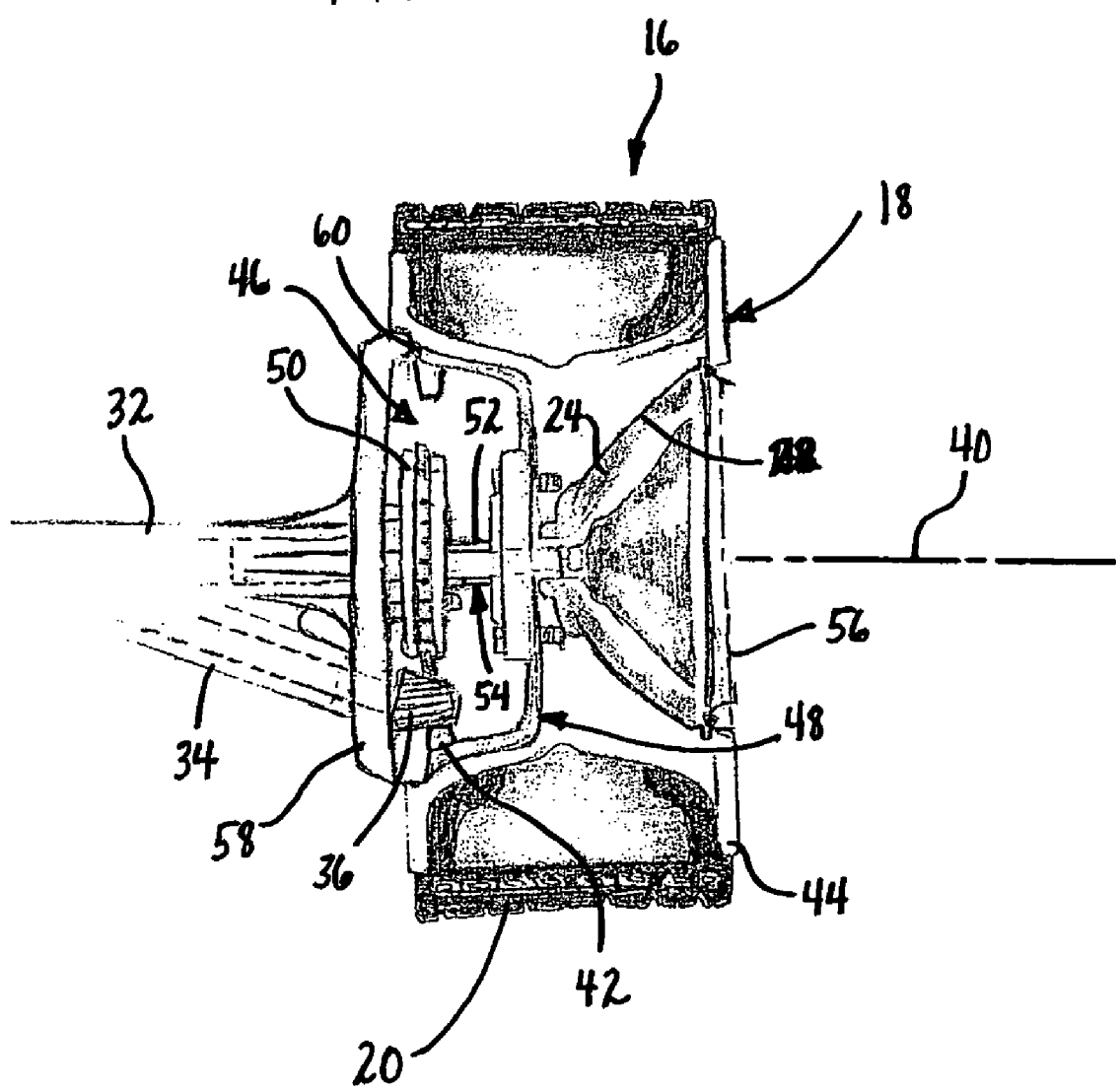
FIG. 3 is an elevational view illustrating a motive wheel of a vehicle employing the present invention.

FIG. 3 illustrates, partly in section, a rim assembly in accordance with the present invention. FIG. 3 illustrates the rim 18 mounting a tire 20 at the radial periphery 44 thereof. As one will observe, the rim 18 is mounted for rotation about the axis 40 of elongation of the corresponding vehicle drive shaft 32. Rotation is imparted to the rim 18 by means of the pinion gear 36 driving in rotation the ring gear 42 mounted in a generally annular cavity 46 defined within a hub drum 48. That is, the pinion gear 36 is enabled to drive the hub drum 48 and, in turn, the rim 18 because it engages the ring gear 42 at a location spaced radially from the axis 40.

Rotation of the pinion gear 36 results from engagement of gearing carried by the vehicle drive shaft 32 with the pinion gear 36 radially inwardly from the ring gear 42. While the figures illustrate the vehicle drive shaft gearing comprising a center gear 50, coaxial with the axis 40, in engagement with the pinion gear 36 within the hub drum 48, it will be understood that the invention contemplates other embodiments wherein drive of the pinion gear 36 is imparted by means of the vehicle drive shaft 32 in other manners.

FIG. 3 also illustrates a center spindle 52 of a suspension frame 54 which passes through an aperture through the vehicle drive shaft 32. The center spindle 52 does not rotate and defines a conduit which extends outwardly to receive transmission means (not shown) for generating a visual presentation at the monitor 26 (shown in FIG. 1).

As previously described, an outwardly facing surface of the rim 18 defines a cavity 22 within which the monitor 26 can be received. A monitor casing 24, as previously described, can be rigidly attached to the center spindle 52 to receive the monitor 26. A protection plate 56, transparent in nature, can cover the monitor 26 on the outer side of the rim 18 in order to protect the monitor 26 from damage or destruction.

FIG. 3 also shows a hub drum cover 58 as protecting the gearing arrangements from contamination by road salt, tar, etc. If necessary or desirable, insulative material can be applied at seams to further protect the inner components.

Figure 4:
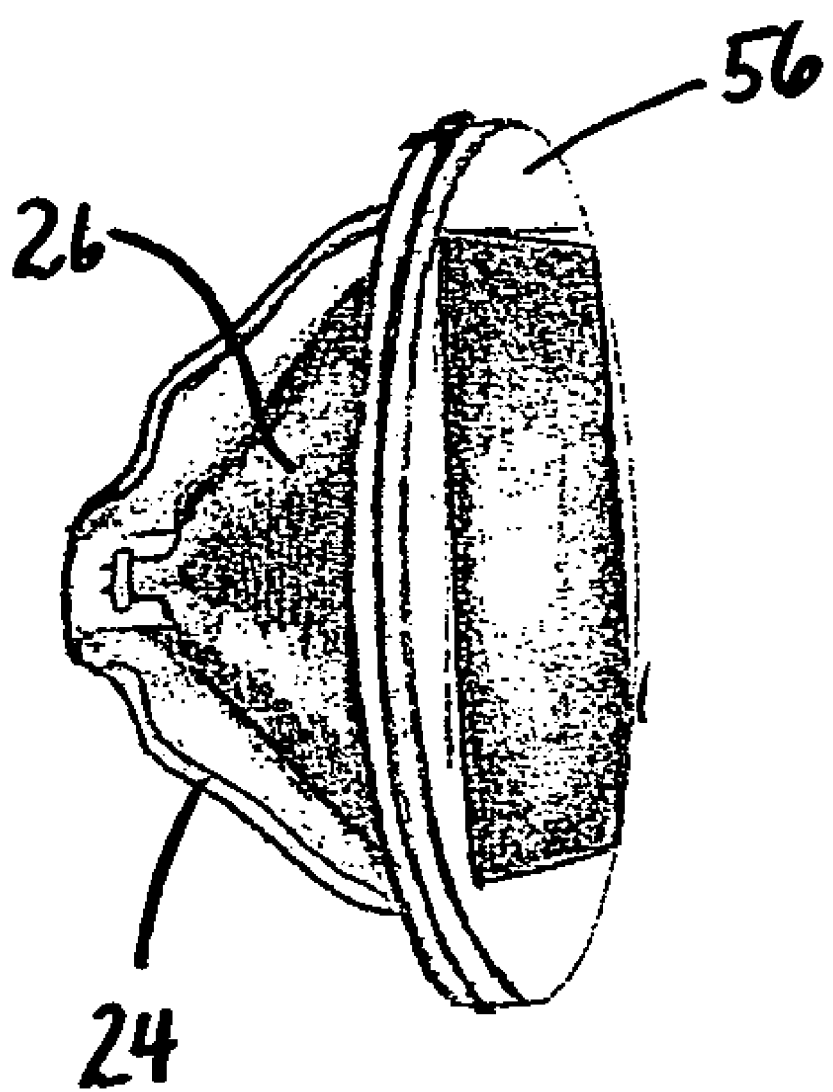
FIG. 4 is a perspective view showing a monitor casing of the present invention, some parts broken away.

FIGS. 4-9 illustrate various piece parts of the invention. FIG. 4 shows the monitor casing 24 in which the monitor 26 can be housed. That figure shows a monitor 26 received within the casing 24 and covered by the transparent protection cover 56. Again, it will be understood that the outer surface of the monitor 26 will substantially conform to a surface defined by the monitor casing 24.

Figure 6:
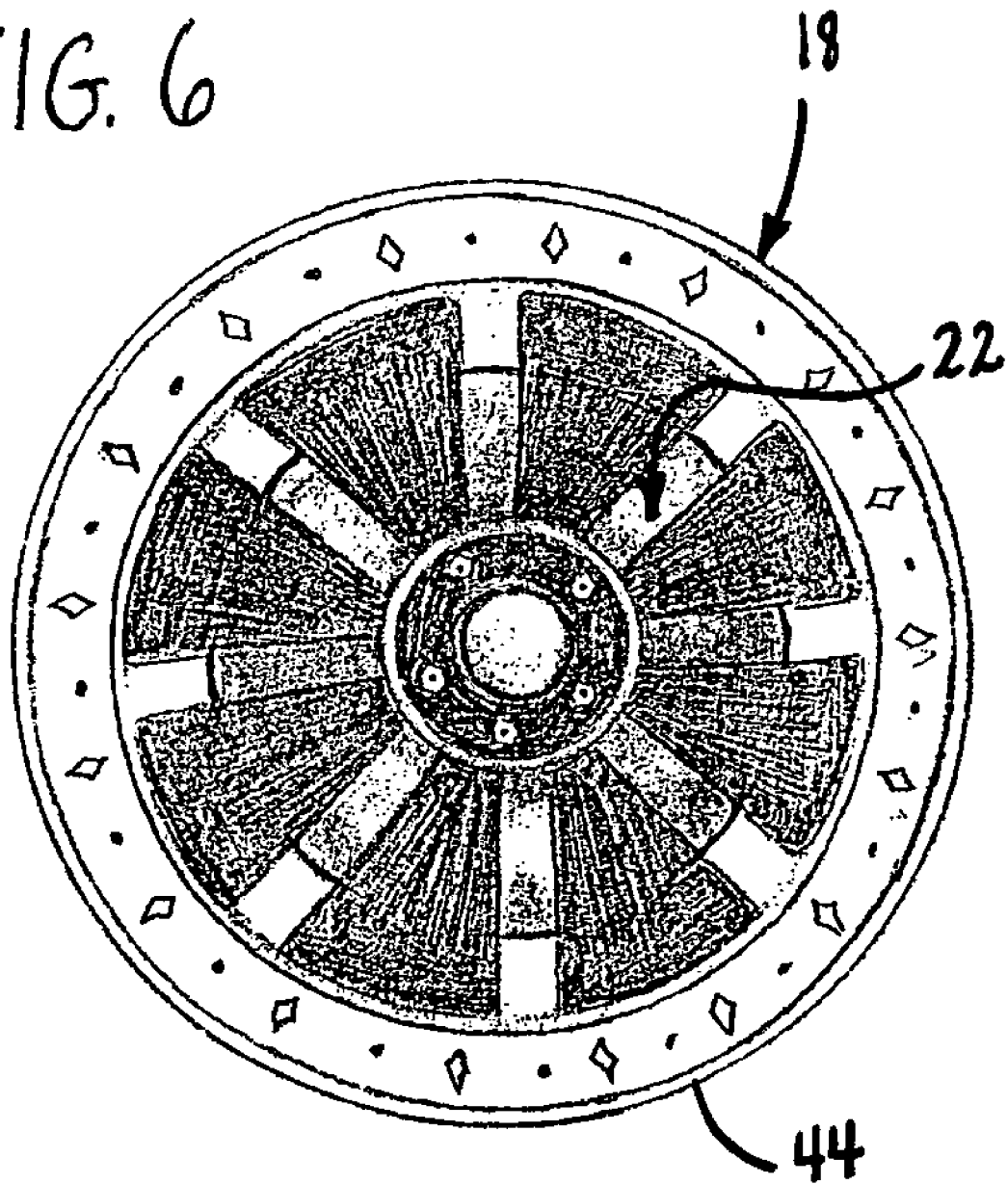
FIG. 6 is a view similar to FIG. 5, but without a tire mounted and with the monitor casing removed.

FIG. 6 illustrates a rim 18 with its outer surface shown in more detail. Seen are the aperture through which connectors passing through the center spindle 52 run, and the cavity 22 within which a monitor 26 and monitor casing 24 are received. It will be understood that, while a particular aesthetic design is shown as being formed in the rim 18, numerous designs are specifically contemplated.

Figure 5:
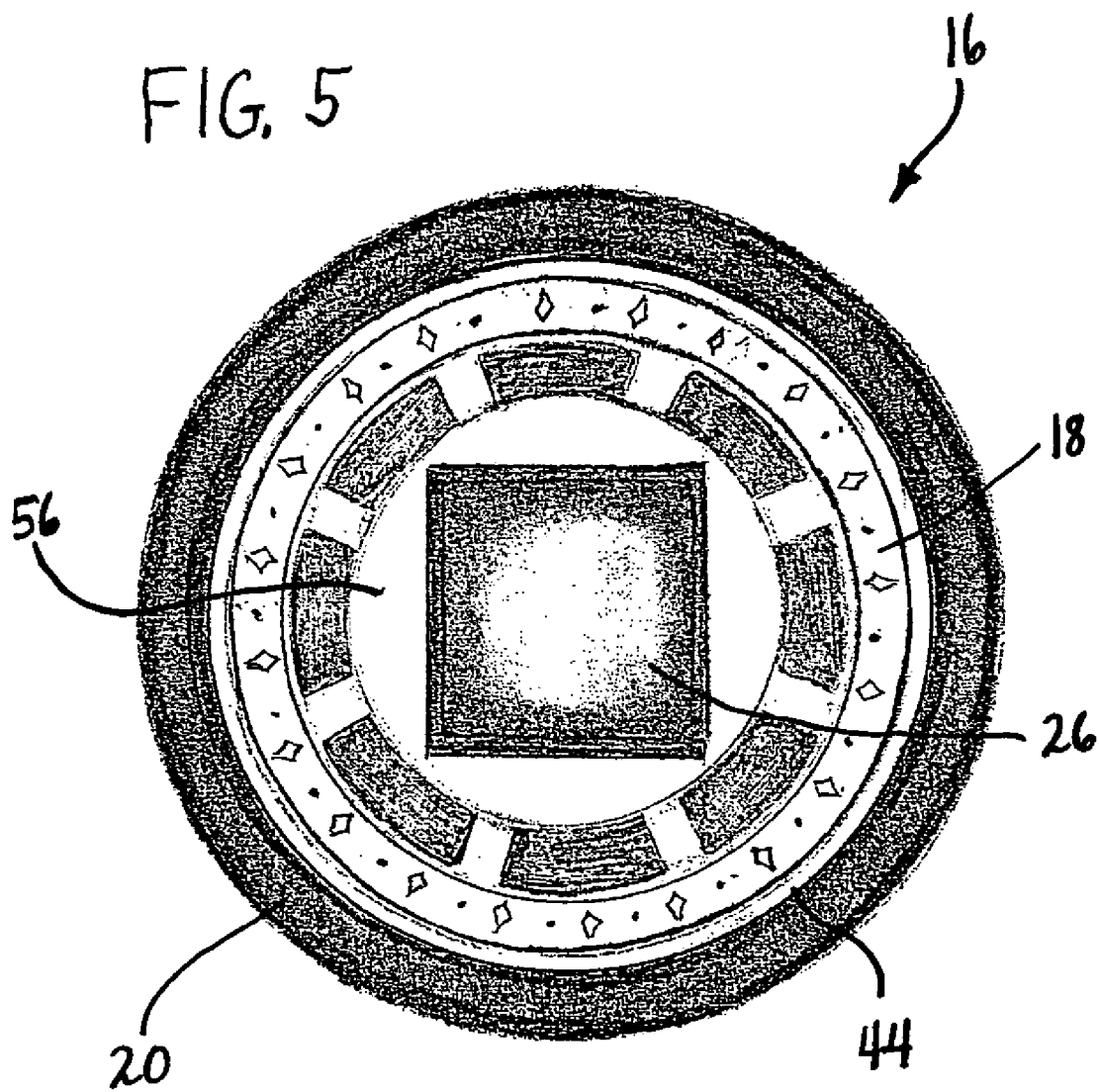
FIG. 5 is an elevational view of a rim, having a tire mounted thereto, with a monitor casing installed therein.

FIG. 5 is similar to FIG. 6. In FIG. 5, however, a tire 20 is mounted on the rim 18, and the monitor 26 and monitor casing 24 are installed within the cavity 22. The monitor protective plate 56 is shown as overlying the monitor 26.

Figure 7:
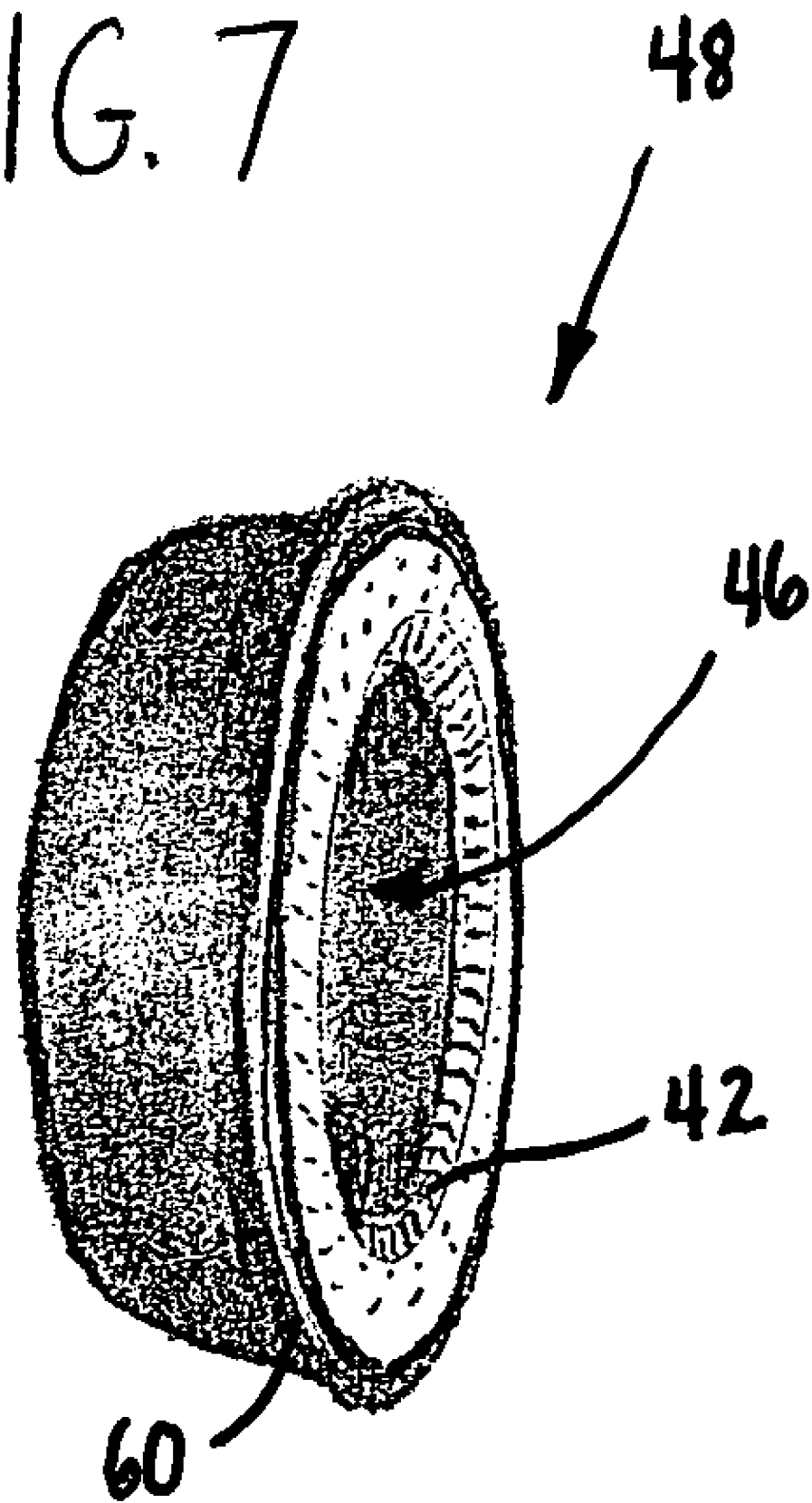
FIG. 7 is a perspective view illustrating a portion of a hub drum having a ring gear mounted therewithin.
Figure 8:
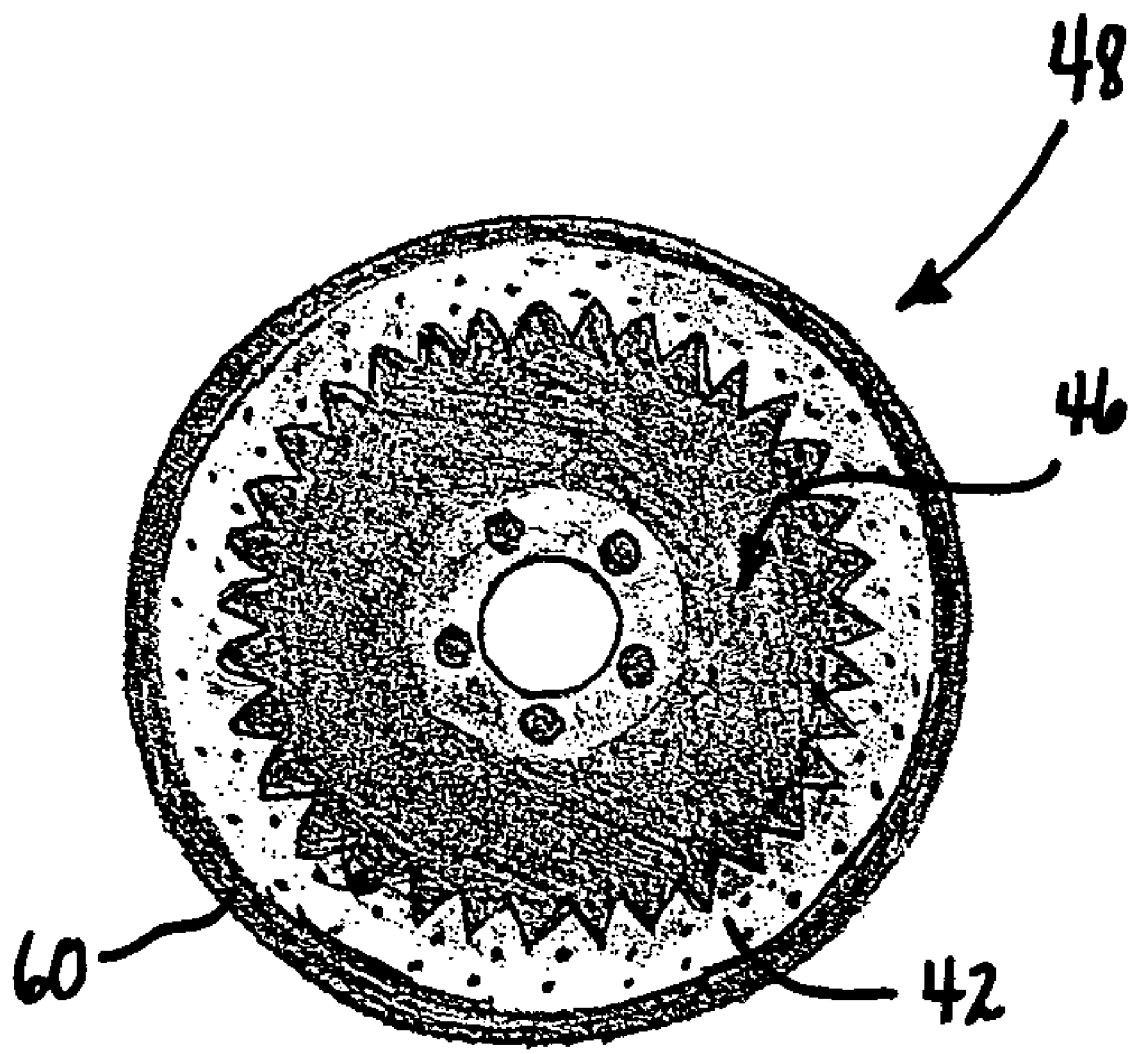
FIG. 8 is an elevational view illustrating the hub drum portion illustrated in FIG. 7.

FIGS. 7 and 8 illustrate the hub drum 48. As best seen in FIG. 7, and as shown in FIG. 3, the hub drum 48 has a lateral dimension sufficient to accommodate and enclose the pinion gear 36 and the center gear 50 mounted to the vehicle drive shaft 32. As best seen in FIG. 8, the ring gear 42 is mounted within the hub drum 48 at an opening lip 60. This arrangement precludes unnecessary wear of the hub drum wall.

Figure 9:
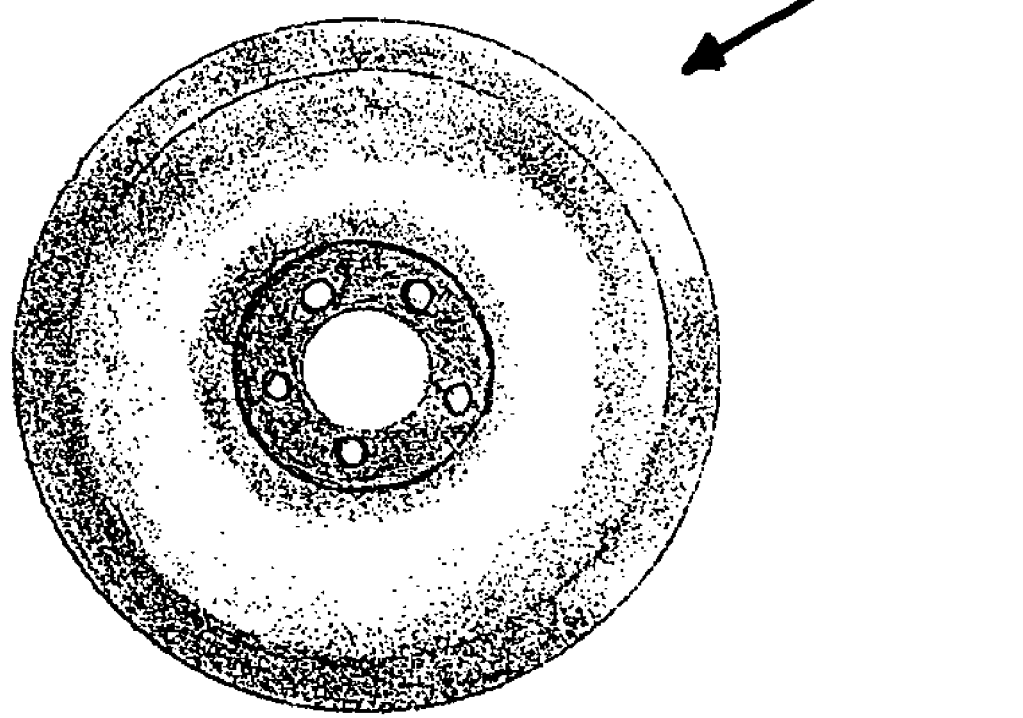
FIG. 9 is an elevational view illustrating a hub drum cover.

FIG. 9 illustrates the hub drum cover 58. The cover 58 can be secured in place occluding the normal aperture defined at the inner face of the rim 18.

The present invention can be employed in portraying any type of visual presentation. Such presentations can range from motion pictures and television shows to advertising and promotional materials.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A vehicle display for use in conjunction with a vehicle having a motive wheel, said display comprising:
   means for presenting visual material; and means for inhibiting rotation of said presenting means at a rim of the motive wheel of the vehicle; wherein said means for presenting visual material comprises a monitor for showing a motion picture or a television show.

2. Apparatus for presenting a video display within a rim of a motive wheel of a vehicle having at least one of said motive wheels, comprising:
   means for mounting a video monitor to the rim; and
   means for inhibiting rotation of said video monitor as the vehicle moves along the ground.

3. Apparatus in accordance with claim 2 wherein said motive wheel is generally circular, and wherein said means for inhibiting comprises means for driving said motive wheel which engage said motive wheel at a point spaced from a center of said motive wheel.

4. A vehicle, comprising:
   at least one motive wheel assembly including a rim, generally circular relative to an axis, mounting a substantially annular tire, said tire defining a generally circular opening coaxial with said rim;
   means for generating a visual presentation in said opening, said visual presentation having a desired orientation; and
   means for inhibiting rotation of said visual presentation from said desired orientation;
   wherein said means for generating a visual presentation comprises a monitor having a rear surface defining a given contour, and wherein said rim has an outwardly facing surface substantially conforming to said given contour of said monitor.

5. A vehicle, comprising:
   at least one motive wheel assembly including a rim, generally circular relative to an axis, mounting a substantially annular tire, said tire defining a generally circular opening coaxial with said rim;
   means for generating a visual presentation in said opening, said visual presentation having a desired orientation; and
   means for inhibiting rotation of said visual presentation from said desired orientation;
   wherein said means for inhibiting comprises means for positively locking said visual presentation against rotation;
   wherein said vehicle further comprises a suspension frame and a conduit, extending from said suspension frame to said means for generating a visual presentation; wherein rigidity of said suspension frame positively locks said visual presentation against rotation; and
   wherein said means for generating a visual presentation comprises a monitor having a rear surface defining a given contour, and wherein said rim has an outwardly facing surface substantially conforming to said given contour of said monitor.

6. Apparatus in accordance with claim 3 wherein said means for driving said motive wheel comprise:
   a stub drive shaft, rotationally driven by a drive shaft of the vehicle, diverging at an acute angle from the drive shaft of the vehicle;
   a pinion gear mounted at a distal end of said stub drive shaft; and
   a ring gear, engaged by said pinion gear, carried by the motive wheel.

7. A vehicle in accordance with claim 4 wherein said means for inhibiting comprises means for positively locking said visual presentation against rotation.

8. A vehicle in accordance with claim 7, said vehicle further comprising a suspension frame and a conduit, extending from said suspension frame to said means for generating a visual presentation; wherein rigidity of said suspension frame positively locks said visual presentation against rotation.

* * * * *